(12) United States Patent
Kimura

(10) Patent No.: US 6,860,608 B2
(45) Date of Patent: Mar. 1, 2005

(54) REAR PROJECTION DISPLAY

(75) Inventor: Keishi Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/779,726

(22) Filed: Feb. 18, 2004

(65) Prior Publication Data

US 2004/0227905 A1 Nov. 18, 2004

(30) Foreign Application Priority Data

Mar. 6, 2003 (JP) ....................... 2003-060262

(51) Int. Cl.$^7$ ............ G03B 21/20; G03B 21/26; G03B 21/22; G03B 21/00; F21S 19/00
(52) U.S. Cl. ............ 353/85; 353/77; 353/94; 353/122; 362/227
(58) Field of Search ............ 353/29, 72, 74, 353/77, 78, 85, 94, 122; 359/460; 348/787, 794; 362/227, 254

(56) References Cited

U.S. PATENT DOCUMENTS 5,829,855 A * 11/1998 Uchiyama .................. 353/74
6,467,911 B1 * 10/2002 Ueyama et al. ............. 353/87

FOREIGN PATENT DOCUMENTS

JP      A 2002-139794      5/2002      ......... G03B/21/00

* cited by examiner

Primary Examiner—Judy Nguyen
Assistant Examiner—Melissa J Koval
(74) Attorney, Agent, or Firm—Oliff & Berridge, PLC

(57) ABSTRACT

A rear projection display is provided which can clearly display a display screen and enable positive recognition of acceptance of operation of a power switch while preventing increases in manufacturing costs and size of the display. A liquid crystal light valve modulates light emitted from a light source lamp to light for displaying a displayed on a screen. An auxiliary lamp higher in a rate of increase in luminance at start of illumination than the source lamp is arranged such that light from the auxiliary lamp can reach a rear surface side of the screen without passing through the liquid crystal light valve. A main control section causes the light source lamp and the auxiliary lamp to both illuminate at power on, and the auxiliary lamp to extinguish before luminance of the source lamp becomes high enough to cause the display screen to be displayed by projection.

4 Claims, 3 Drawing Sheets

REAR PROJECTION DISPLAY

BACKGROUND OF THE INVENTION

1. Field of the Invention

This invention relates to a rear projection display that modulates a light emitted from a light source lamp to thereby display a displayed on a screen.

2. Description of the Related Art

As a rear projection display of this kind, the present assignee has already proposed a rear projection display in Japanese Laid-Open Patent Publication (Kokai) No. 2002-139794. This rear projection display is comprised of light-generating means including a light source formed by a high-pressure mercury-vapor lamp, a metal halide lamp, or the like, for emitting a red light, a green light, and a blue light, light-modulating devices for modulating the respective lights emitted by the light-generating means, projection optical systems formed e.g. by lenses for magnifying the respective lights modulated by the light-modulating devices, reflecting mirrors for reflecting the lights magnified by the projection optical systems, and a rear projection screen that receives lights reflected by the reflecting mirrors, for projection display of various types of display screens. In the rear projection display, when a power switch is operated by a user to turn on the power, the light-generating means starts to be energized to cause the light source to illuminate. Then, the lights emitted by the light-generating means are modulated by the light-modulating devices, and projected onto the screen from a rear surface side thereof via the projection optical systems and the reflecting mirrors. Thus, a display screen dependent on-light modulations by the light-modulating devices is displayed on the screen.

However, from the study of the above described rear projection display, the present inventor found out the following points for improvement: In the rear projection display, a high-pressure mercury-vapor lamp, a metal halide lamp, or the like, is employed as the light source. In the case of the high-pressure mercury-vapor lamp or the metal halide lamp, after the energization thereof is started, it takes a time period ranging from several tens of seconds to several minutes, before the luminance thereof is increased to such a level that the display can be displayed by projection. Therefore, for some time after the power switch was operated by the user, no displayed appears on the screen. Thus, in the rear projection display, when the power switch is operated, it is difficult for the user to recognize whether or not the rear projection display has accepted the operation of the power switch, so that improvement on this point is desirable. In this case, it can be contemplated to configure the rear projection display such that the high-pressure mercury-vapor lamp or the like as the light source for projection display is replaced by a lamp (e.g. a halogen lamp) whose luminance level increases at a fast rate at the start of illumination, thereby enabling projection display of a display screen immediately after the power switch is operated. However, this kind of lamp whose luminance level rises at a fast rate at the start of illumination is generally lower in luminance level than the high-pressure mercury-vapor lamp or the like, which makes it difficult to clearly display a display screen by projection. On the other hand, it can be also contemplated to configure the rear projection display such that the two lamps of a high-pressure mercury-vapor lamp and a halogen lamp, for example, are arranged for simultaneous illumination at power on, and a light emitted from the halogen lamp is used for projection display until the luminance level of a light emitted by the high-pressure mercury-vapor lamp becomes high enough. However, this configuration necessitates provision of prisms, reflecting mirrors, etc., for guiding the respective lights emitted by the two lamps to the light-modulating devices and projection optical systems. This brings about the problem of the increased manufacturing costs of the rear projection display owing to the additional costs of these components and the increased size of the entire display.

SUMMARY OF THE INVENTION

The present invention has been made in view of the above-described points for improvement, and a main object thereof is to provide a rear projection display which is capable of clearly displaying a display screen, and at the same time enables positive recognition of whether or not operation of a power switch has been accepted while preventing increases in the manufacturing costs and size of the rear projection display.

To attain the above object, according to a first aspect of the invention, there is provided a rear projection display comprising a screen, a light source lamp for emitting a light, a light-modulating section for modulating the light emitted from the light source lamp to a light for displaying a displayed on the screen, an auxiliary lamp that is higher in a rate of increase in luminance at a start of illumination than the light source lamp, and arranged such that a light emitted from the auxiliary lamp can reach a rear surface side of the screen without passing through the light-modulating section, and a control section that causes both of the light source lamp and the auxiliary lamp to illuminate at power on, and causes the auxiliary lamp to extinguish before luminance of the light source lamp reaches a luminance level high enough to cause the display screen to be displayed on the screen by projection.

According to this rear projection display, the control section turns on both of the light source lamp and the auxiliary lamp at power on. In this rear projection display, the luminance of the auxiliary lamp increases at a faster rate at the start of illumination than that of the light source lamp, which causes the light emitted from the auxiliary lamp to be projected onto the screen immediately after power on. Therefore, it is possible to cause the user to positively and promptly recognize that operation of the power switch has been normally accepted.

To attain the above object, according to a second aspect of the invention, there is provided a rear projection display comprising a screen, a light source lamp for emitting a light, a light-modulating section for modulating the light emitted from the light source lamp to a light for displaying a displayed on the screen, an auxiliary lamp that is higher in a rate of increase in luminance at a start of illumination than the light source lamp, and arranged such that a light emitted from the auxiliary lamp can reach a rear surface side of the screen without passing through the light-modulating section, and a control section that causes both of the light source lamp and the auxiliary lamp to illuminate at power on, and causes the auxiliary lamp to extinguish after luminance of the light source lamp reaches a luminance level high enough to cause the display screen to be displayed on the screen by projection.

According to this rear projection display, the control section turns on both of the light source lamp and the auxiliary lamp at power on. In this case, the auxiliary lamp is kept on with the luminance thereof reduced (with the luminance thereof lowered) even after the luminance of the light source lamp has reached a luminance level high enough to cause the display screen to be displayed on the screen by projection. This makes it possible to cause the user to positively and promptly recognize that operation of the power switch has been normally accepted.

Preferably, the control section progressively reduces the luminance of the auxiliary lamp from a time when the auxiliary lamp has been lighted to a time when the auxiliary lamp is extinguished. Due to this construction, differently from the construction in which the lighted auxiliary lamp is instantly extinguished, it is possible to cause the user to recognize that the operation of the power switch has been normally accepted, without causing the user to feel a sense of disorder.

BRIEF DESCRIPTION OF THE DRAWINGS

These and other objects and features of the present invention will be explained in more detail below with reference to the attached drawings, wherein.

DESCRIPTION OF THE PREFERRED EMBODIMENT

The present invention will now be described with reference to the drawings showing a rear projection display according to a preferred embodiment thereof.

Figure 1:
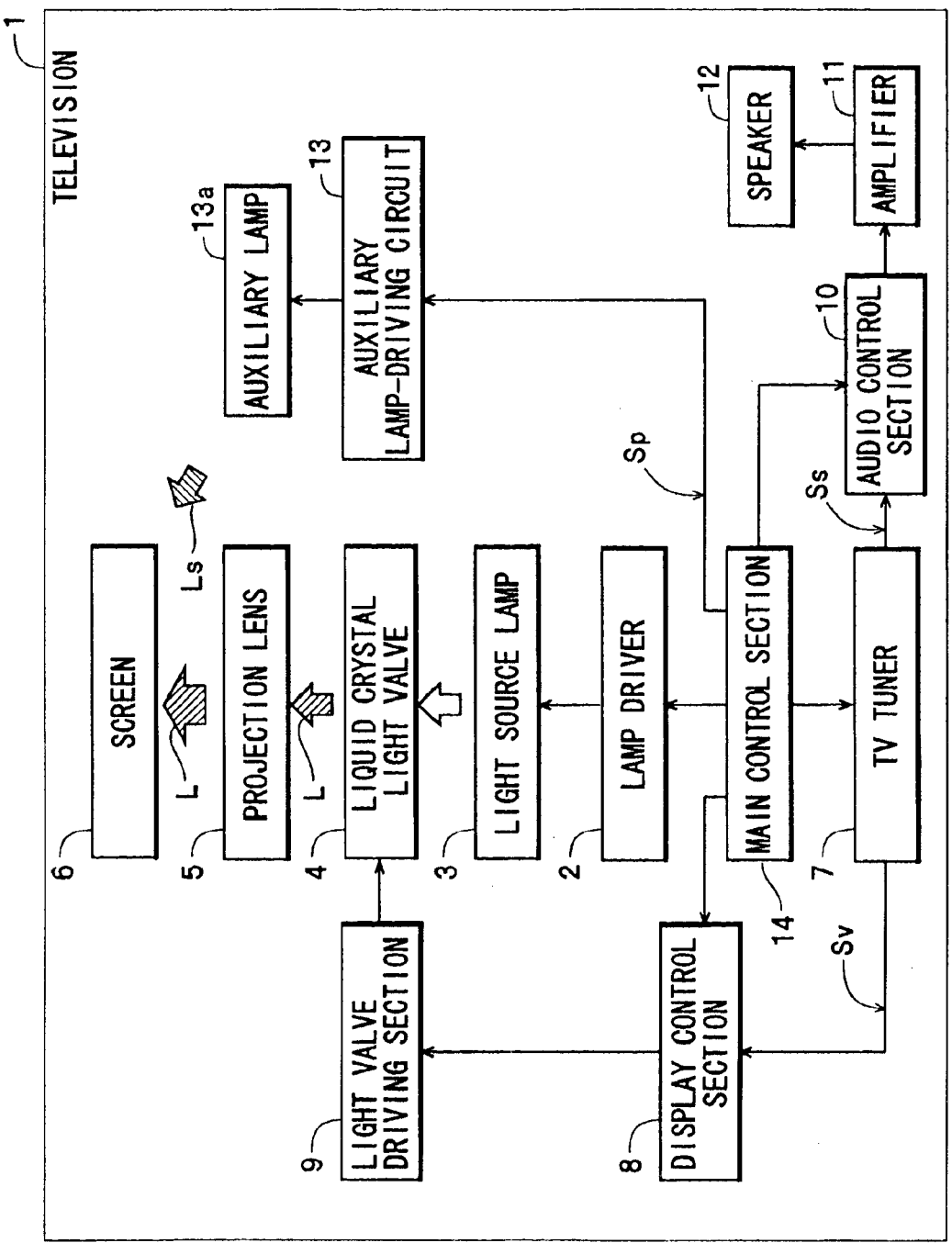
FIG. 1 is a block diagram showing the arrangement of a television.

A television 1 shown in FIG. 1 is an example of the rear projection display according to the present invention. The television 1 is comprised of a lamp driver 2, a light source lamp 3, a liquid crystal light valve 4, a projection lens 5, a screen 6, a TV tuner 7, a display control section 8, a light valve-driving section 9, an audio control section 10, an amplifier 11, a speaker 12, an auxiliary lamp-driving circuit 13, an auxiliary lamp 13a, and a main control section 14, for displaying various display screens. Further, the television 1 includes a power supply section, an operation section (a power switch, a channel selecting button, etc.), a remote control, and a video signal input section, none of which is shown.

Figure 3:
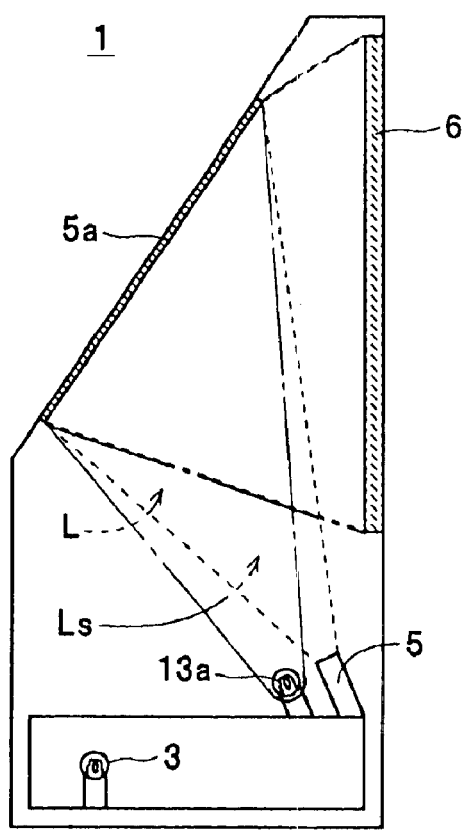
FIG. 3 is a side sectional view showing the arrangement of the television.

The lamp driver 2 supplies power to the light source lamp 3 and stops the supply of the power to the same under the control of the main control section 14, to thereby control the turning-on (start of energization) and turning-off (stop of energization) of the light source lamp 3. The light source lamp 3 is formed e.g. by a high-pressure mercury-vapor lamp, and turned on under the control of the lamp driver 2, for emission of white light. The liquid crystal light valve 4, which corresponds to a light-modulating section as an element of the present invention, is comprised of a liquid crystal panel, a incident-side polarizing plate, and a irradiation-side polarizing plate, for modulating, under the control of the light valve-driving section 9, the white light emitted from the light source lamp 3 into projection light L which is shaded and colored for being projected to display the display screen. The projection lens 5 magnifies the projection light L modulated by the liquid crystal light valve 4 to thereby project the projection light L toward a rear surface side of the screen 6. In this embodiment, as indicated by broken lines in FIG. 3, the projection light L magnified by the projection lens 5 is reflected by a reflecting mirror 5a disposed within a casing of the television 1, thereby being projected onto the screen 6. The screen 6 receives and converts the projection light L modulated by the liquid crystal light valve 4, into dispersed light or parallel light, thereby displaying various display screens.

The TV tuner 7 receives a TV broadcast wave via an antenna, not shown, and extracts and outputs a video signal Sv and an audio signal Ss. The display control section 8 generates e.g. an RGB video signal based on the video signal Sv output from the TV tuner 7, and delivers the resulting RGB video signal to the light valve-driving section 9. The light valve-driving section 9 drives the liquid crystal light valve 4 according to the video signal output from the display control section 8, thereby causing the liquid crystal light valve 4 to carry out the above-described light modulation. The audio control section 10 extracts an audio signal of sound (e.g. either a main audio or a sub audio) to be produced in synchronism with display of images, from the audio signal Ss output from the TV tuner 7, and delivers the extracted audio signal to the amplifier 11. The amplifier 11 amplifies the audio signal output from the audio control section 10 and delivers the amplified audio signal to the speaker 12. The speaker 12 outputs various sounds based on the audio signal amplified by the amplifier 11.

Figure 2:
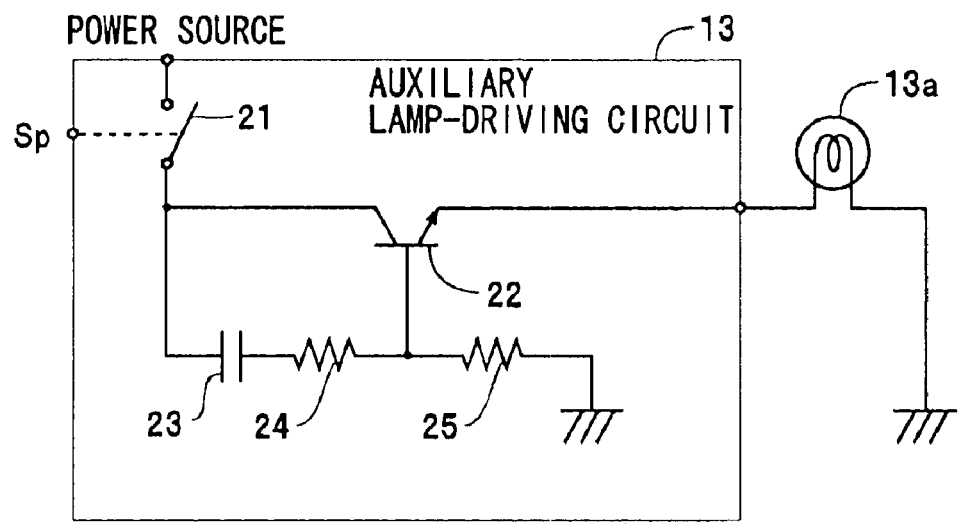
FIG. 2 is a circuit diagram showing the arrangement of an auxiliary lamp-driving circuit.

The auxiliary lamp-driving circuit 13 forms a control section as an element of the present invention, together with the main control section 14, and drives the auxiliary lamp 13a while changing the amount of the power supplied to the auxiliary lamp 13a. More specifically, as shown in FIG. 2, the auxiliary lamp-driving circuit 13 is comprised e.g. of a switch 21, a transistor 22 for supplying the power, a capacitor 23, and resistances 24 and 25. In this embodiment, the switch 21 is controlled to the ON state by a power control signal Sp output from the main control section 14 at power on, to thereby allow the power to be supplied to the transistor 22. The transistor 22 controls the power supply to the auxiliary lamp 13a. The capacitor 23 and the resistances 24 and 25 form a time constant circuit that defined a time period over which the power is supplied to the auxiliary lamp 13a via the transistor 22. In this case, a time constant formed by the capacitor 23 and the resistances 24 and 25 is defined to be approximately 10 seconds, for example. Therefore, a collector current output from the transistor 22 becomes the maximum in a relatively short time period after the power is turned on, and thereafter progressively reduced over 10 seconds to an approximately 0 ampere. The auxiliary lamp 13a is formed by a lamp (such as a tungsten lamp or a light emitting diode) that starts to emit light at a fast rate of increase in luminance level when turned on (luminance level of the emitted light becomes high enough in a short time period), and emits a bluish white incident light Ls when it is on. In this case, the auxiliary lamp 13a is arranged such that the bluish white incident light Ls emitted during illumination thereof directly reaches the rear surface side of the screen 6 via the reflecting mirror 5a (without passing through the liquid crystal light valve 4 or the projection lens 5).

The main control section 14 controls the overall operation of the television 1 including the lamp driver 2, the TV tuner 7, the display control section 8, the audio control section 10, and so forth, in a centralized operation, and at the same time controls the driving of the auxiliary lamp 13a by the auxiliary lamp-driving circuit 13 through outputting the power control signal Sp, as described hereinabove.

In the television 1, when the power switch provided in a body thereof is operated by a user to turn on the power, first, the main control section 14 outputs a control signal which instructs the lamp driver 2 to start energization of the light source lamp 3. In response to the control signal, the lamp driver 2 starts to energize the light source lamp 3. Further, the main control section 14 outputs the power control signal Sp to the auxiliary lamp-driving circuit 13. At this time, in the auxiliary lamp-driving circuit 13, the switch 21 is held in the ON state e.g. for approximately 15 seconds, whereby the transistor 22 supplies the collector current only for 10 seconds. As result, as described hereinabove, the power is supplied to the auxiliary lamp 13a from the auxiliary lamp-driving circuit 13, whereby the auxiliary lamp 13a is lighted. In this case, as indicated by one-dot chain lines in FIG. 3, the incident light Ls emitted from the auxiliary lamp 13a is reflected by the reflecting mirror 5a so as to be directly projected onto the screen 6 from the rear surface side thereof. This causes the whole screen 6 to be viewed in a state thereof glowing with a bluish white light immediately after the power switch has been operated, so that the user can recognize that the television 1 has accepted the operation for turning on the power (the turning-on of the power has been completed) at the instant of operation of the power switch.

Figure 4:
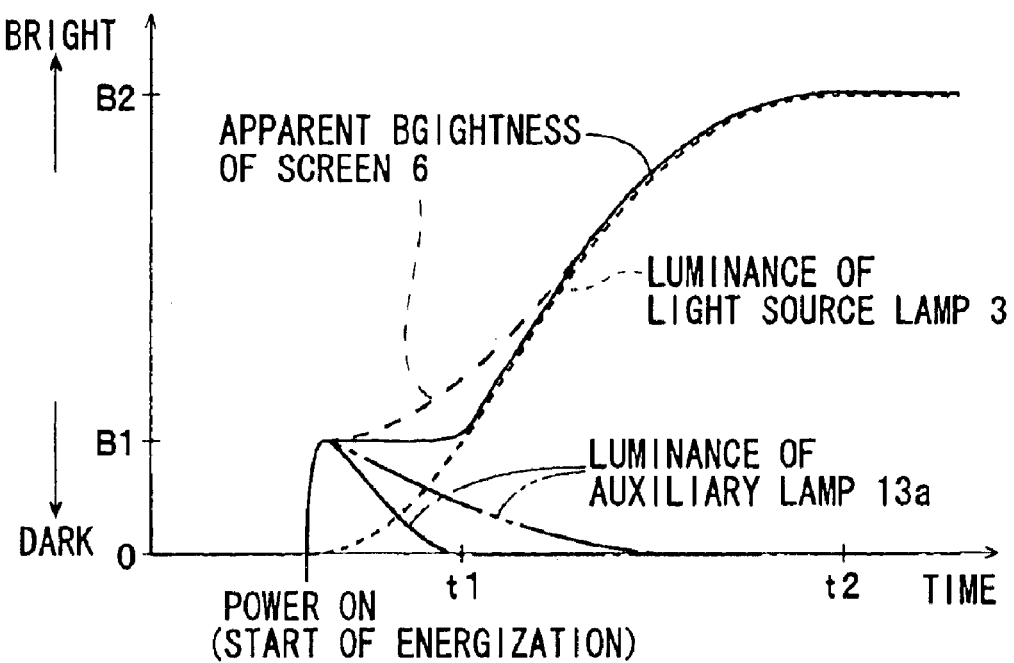
FIG. 4 is a characteristics diagram showing the relationship between changes in respective luminance levels of a light source lamp and an auxiliary lamp, and the apparent brightness of a screen.

On the other hand, as indicated by a broken line in FIG. 4, the luminance of the light source lamp 3 having started to be energized along with the supply of the power rises to a level equal to or higher than a luminance level B1 (level enabling the user to recognize that light is projected onto the screen 6) at which a display screen subjected to projection display can be displayed on the screen 6, at a time t1 when approximately 10 seconds have passed after the start of the energization of the light source lamp 3, and then it rises to a luminance level B2 at which the user can clearly recognize the display screen, at a time t2 when approximately 30 seconds have passed after the start of the energization of the light source lamp 3. Further, as indicated by a one-dot chain line in FIG. 4, the luminance of the auxiliary lamp 13a rises up to the luminance level B1 in a relatively short time period immediately after power on, and thereafter progressively lowers until it becomes zero (extinguished state) at the time t1 approximately 10 seconds after the start of the energization of the light source lamp 3. Accordingly, the apparent brightness of the screen 6 onto which the projection light L emitted by the light source lamp 3 and the incident light Ls emitted by the auxiliary lamp 13a are projected is that of synthesized light of the projection light L and incident light Ls, as indicated by a solid line, so that it rises up to the luminance level B1 in a relatively short time period immediately after power on, and thereafter progressively rises to the luminance level B2 at which the user can clearly recognize the display screen. Alternatively, in increasing the apparent brightness of the screen 6, as indicated by a two-dot chain line in FIG. 4, it is also possible to hold the auxiliary lamp 13a in the lighted or illuminating state such that the luminance thereof is progressively reduced after the luminance of the light source lamp 3 has reached the luminance level B1. In this case, the apparent brightness of the screen 6 changes as indicated by a rough broken line in FIG. 4.

In the meanwhile, at power on, the TV tuner 7 starts to receive the TV broadcast wave, and extracts a video signal Sv and an audio signal Ss, so as to deliver the video signal Sv to the display control section 8, and the audio signal Ss to the audio control section 10. The display control section 8 generates the RGB video signal based on the video signal Sv received from the TV tuner 7, and delivers the RGB video signal to the light valve-driving section 9. In response to the video signal, the light valve-driving section 9 converts the white light emitted from the light source lamp 3 to the projection light L projected for displaying a display screen. As a result, the projection light L magnified by the projection lens 5 is projected onto the screen 6 to thereby display a display screen corresponding to the video signal Sv on the screen 6. Further, the audio control section 10 outputs the audio signal corresponding e.g. to the main audio extracted from the audio signal Ss delivered from the TV tuner 7. Then, the audio signal delivered by the audio control section 10 is amplified by the amplifier 11, and in this example, the main audio is output from the speaker 12.

As described above, according to the television 1, at power on, both of the light source lamp 3 and the auxiliary lamp 13a are lighted, whereby the screen 6 is viewed in a state thereof made brighter by the incident light Ls emitted from the auxiliary lamp 13a immediately after power on. This enables the user to positively and promptly recognize whether or not the television 1 has accepted the operation of the power switch. In this embodiment, by turning off the auxiliary lamp 13a before the luminance level of the light source lamp 3 reaches such a level necessitated for projection display of the displayed on the screen, it is possible to prevent the display of the display screen from being interfered by the incident light Ls emitted from the auxiliary lamp 13a. Alternatively, by turning off the auxiliary lamp 13a after the luminance of the light source lamp 3 has reached such a luminance level that the display screen can be displayed on the screen, the screen 6 can be viewed in a state thereof made even brighter by the incident light Ls emitted by the auxiliary lamp 13a. As a result, it is possible to cause the user to more positively recognize whether or not the television 1 has accepted the operation of the power switch.

Further, the television 1 is configured such that the luminance of the auxiliary lamp 13a is progressively reduced to extinguish the auxiliary lamp 13a, whereby differently from the construction in which the lighted auxiliary lamp 13a is instantly extinguished, it is possible to cause the user to recognize whether or not the television 1 has accepted the operation of the power switch, without causing the user to feel a sense of disorder. Further, the auxiliary lamp 13a is arranged such that the incident light Ls emitted therefrom reaches the rear surface side of the screen 6 without passing through the liquid crystal light valve 4, whereby differently from the construction in which two lamps different from each other in the rate of increase in luminance are arranged as respective light source lamps, it is possible to dispense with prisms and reflecting mirrors. This makes it possible to prevent increases in the manufacturing costs and the size of the television 1. Further, since the auxiliary lamp 13a emits the bluish white incident light Ls, it is possible to cause users, who are familiar with a blue screen to be displayed on the screen 6 when no display screens are displayed thereon, to recognize the fact that the power on has been completed, without causing the users to feel a sense of disorder. Further, differently from the construction in which a halogen lamp or the like is used as a light source for projected, a display screen can be clearly displayed by light emitted from the light source lamp 3.

It should be noted that the present invention is not limited to the above embodiment. For example, although in the above described embodiment, the auxiliary lamp 13a is formed by a tungsten lamp or a light emitting diode, this is not limitative, but the auxiliary lamp 13a can be formed by employing various kinds of lamps so long as the luminance level thereof rises at a fast rate at the start of illumination. Further, although in the above described embodiment, description has been give of a case in which the auxiliary lamp 13a is lighted when the power switch disposed on the body is operated, this is not limitative, but even when the power is turned on using a remote control, it is also possible to turn on the auxiliary lamp 13a in the same manner.

What is claimed is:

1. A rear projection display comprising:
   a screen;
   a light source lamp for emitting a light;
   a light-modulating section for modulating the light emitted from the light source lamp to a light for displaying a display screen on the screen;
   an auxiliary lamp that is higher in a rate of increase in luminance at a start of illumination than the light source lamp, and arranged such that a light emitted from the auxiliary lamp can reach a rear surface side of the screen without passing through the light-modulating section; and
   a control section that causes both of the light source lamp and the auxiliary lamp to illuminate at power on, and causes the auxiliary lamp to extinguish before luminance of the light source lamp reaches a luminance level high enough to cause the display screen to be displayed on the screen by projection.

2. A rear projection display comprising:
   a screen;
   a light source lamp for emitting a light;
   a light-modulating section for modulating the light emitted from the light source lamp to a light for displaying a display screen on the screen;
   an auxiliary lamp that is higher in a rate of increase in luminance at a start of illumination than the light source lamp, and arranged such that a light emitted from the auxiliary lamp can reach a rear surface side of the screen without passing through the light-modulating section; and
   a control section that causes both of the light source lamp and the auxiliary lamp to illuminate at power on, and causes the auxiliary lamp to extinguish after luminance of the light source lamp reaches a luminance level high enough to cause the display screen to be displayed on the screen by projection.

3. A rear projection display as claimed in claim 1, wherein the control section progressively reduces the luminance of the auxiliary lamp from a time when the auxiliary lamp has been lighted to a time when the auxiliary lamp is extinguished.

4. A rear projection display as claimed in claim 2, wherein the control section progressively reduces the luminance of the auxiliary lamp from a time when the auxiliary lamp has been lighted to a time when the auxiliary lamp is extinguished.

* * * * *